United States Patent [19]

Cook

[11] Patent Number: 4,565,539
[45] Date of Patent: Jan. 21, 1986

[54] MULTIPLE-USE SHAFT FOR TOY

[75] Inventor: John S. Cook, Redondo Beach, Calif.

[73] Assignee: Mattel, Inc., Hawthorne, Calif.

[21] Appl. No.: 534,027

[22] Filed: Sep. 19, 1983

[51] Int. Cl.⁴ ...................... A63H 29/20; B60B 35/12; B60B 37/04
[52] U.S. Cl. .................................... 446/462; 301/128; 446/469; 464/179
[58] Field of Search ................ 446/443, 448, 457–459, 446/461–464; 464/179, 182, 158, 159; 74/416, 431, 434, 457; 301/1, 126, 128

[56] References Cited

U.S. PATENT DOCUMENTS

| 177,337 | 5/1976 | Johnson . | |
|---|---|---|---|
| 1,609,275 | 11/1926 | Tyler . | |
| 2,015,430 | 9/1935 | Matthews et al. | 464/179 |
| 2,034,001 | 3/1936 | Ricefield | 64/14 |
| 2,101,009 | 11/1937 | Mitchell | 464/179 X |
| 2,859,939 | 11/1958 | Petrell | 255/23 |
| 2,871,831 | 2/1959 | Patin | 121/68 |
| 2,907,188 | 10/1959 | Schmitter | 64/11 |
| 2,969,250 | 1/1961 | Kull | 287/126 |
| 2,984,995 | 5/1961 | Kalen | 464/159 |
| 3,008,310 | 11/1961 | Bastow et al. | 64/1 |
| 3,232,075 | 2/1966 | Wildhaber | 64/9 |
| 3,613,291 | 10/1971 | Howe | 446/103 |
| 3,620,044 | 11/1971 | Latour | 64/14 |
| 3,805,552 | 4/1974 | Heald | 64/23 |
| 4,098,096 | 7/1978 | Chard et al. | 64/14 |
| 4,125,000 | 11/1978 | Grob | 64/23 |
| 4,167,127 | 9/1979 | Calvert | 74/416 |
| 4,307,584 | 12/1981 | Sandiumenge | 64/14 |
| 4,357,137 | 11/1982 | Brown | 464/159 X |

FOREIGN PATENT DOCUMENTS

| 197281 | 4/1958 | Austria | 464/158 |
|---|---|---|---|
| 1412110 | 10/1975 | United Kingdom | 464/158 |

Primary Examiner—F. Barry Shay
Attorney, Agent, or Firm—Ronald M. Goldman; Melvin A. Klein

[57] ABSTRACT

A toy vehicle utilizing a multiple-use shaft which is cylindrical and has a series of longitudinal grooves parallel to the longitudinal axis, each groove having a shape to mate with both gear teeth and keys. The groove edges are radiused to eliminate gouging of bearing surfaces in which the shaft is journaled. Internally splined gears are slidably mounted on the shaft with their splines fitted in driving relation to the multiple-use shaft.

5 Claims, 8 Drawing Figures

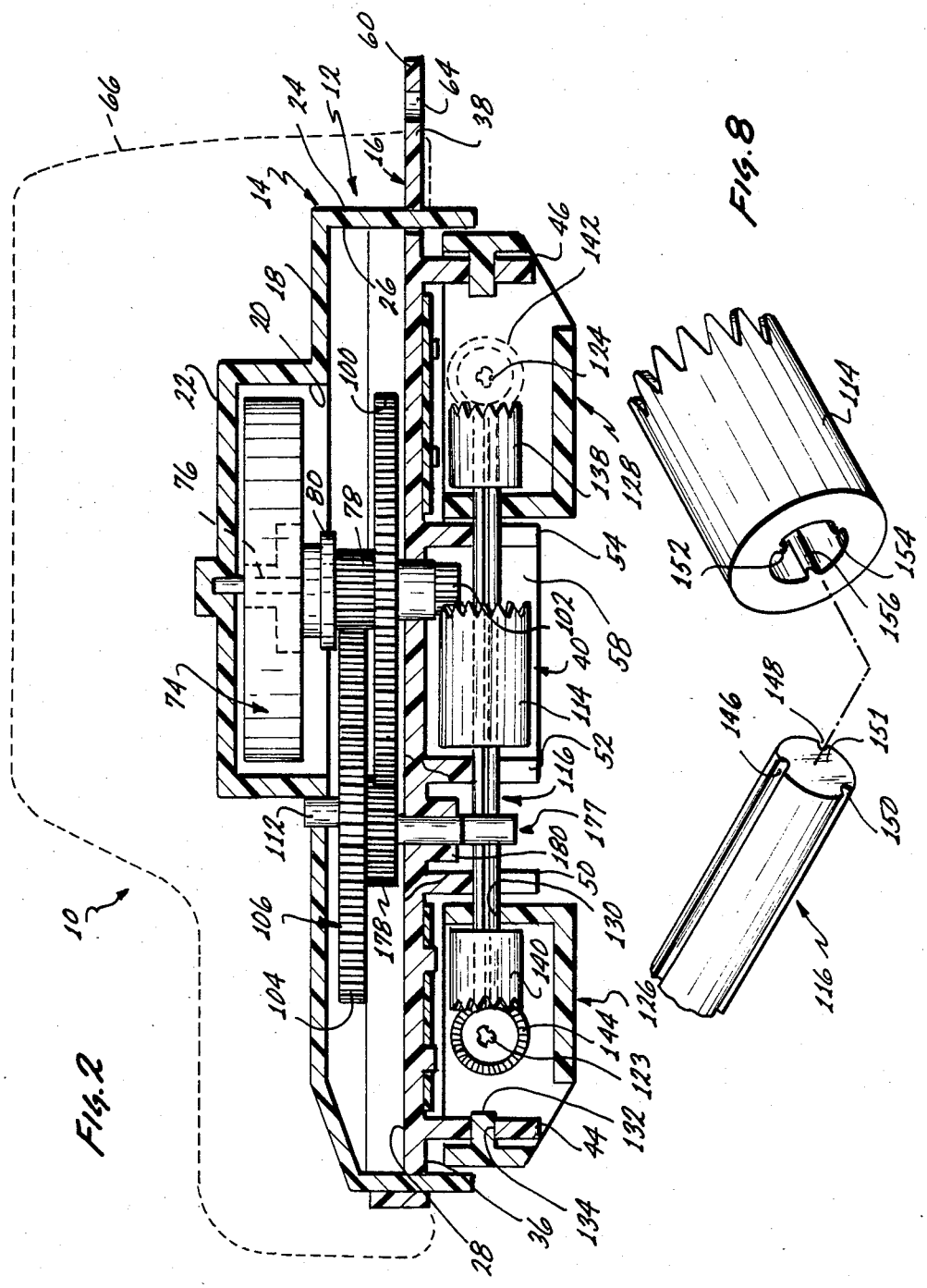

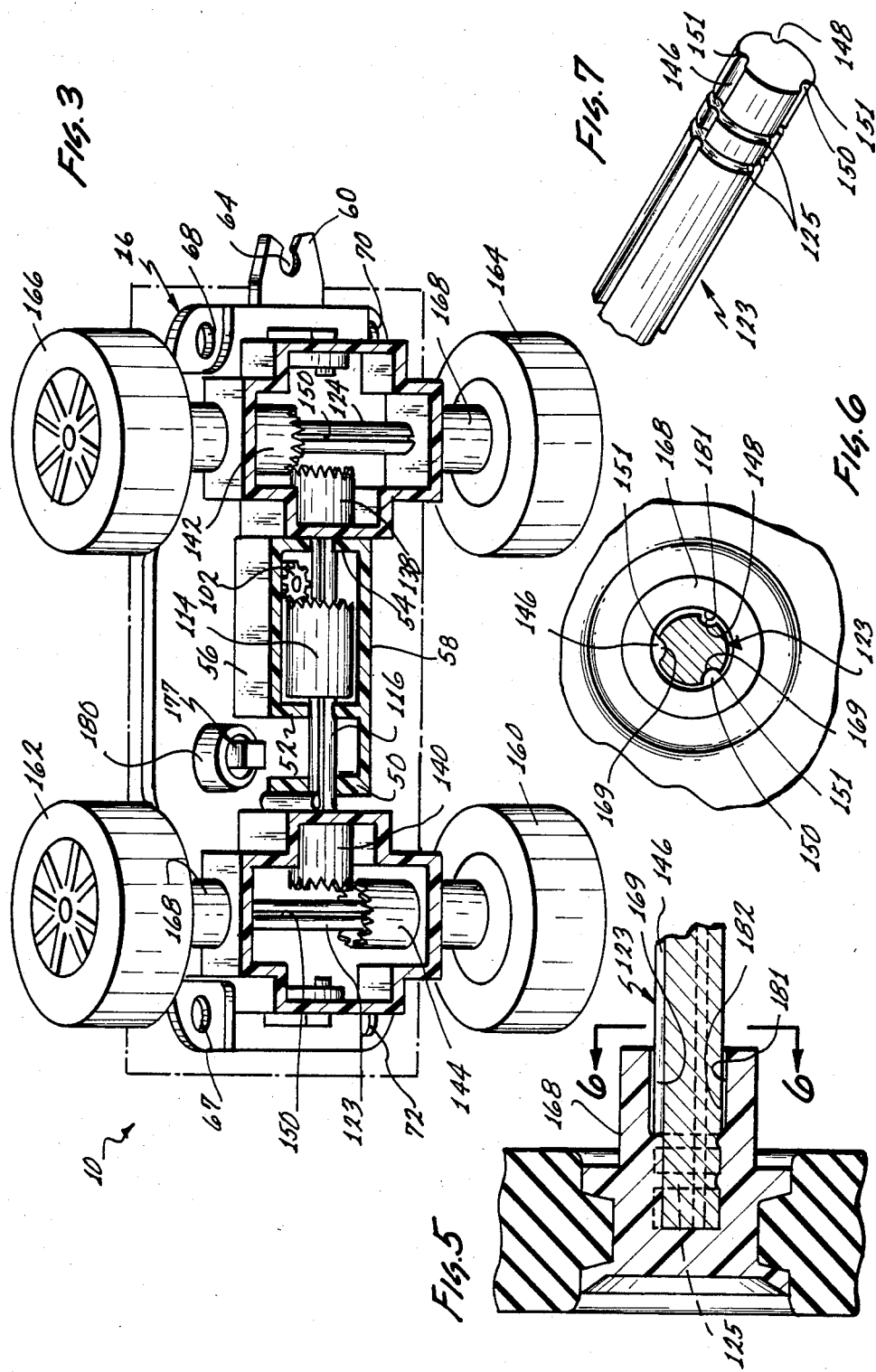

MULTIPLE-USE SHAFT FOR TOY

DESCRIPTION

1. Technical Field

The present invention relates to toys and, more particularly, to a multiple-use shaft for powered toys. The use of the present invention is shown in U.S. patent application Ser. No. 455,686 for a Powered Toy Vehicle With Pivotable Axle Mounting, filed Jan. 5, 1983, now U.S. Pat. No. 4,509,931, and assigned to the assignee of the present invention.

Powered toys often have an assortment of different mechanical moving parts. For example, a toy automobile has driven axles onto which wheels are pressed for rotation thereby, a drive shaft which rotates a gear keyed to one end, and clutches and transmissions which require gears sliding on rotating shafts. Such shafts often are required to project through walls and of necessity, run in bearings.

2. Background Art

The prior art has provided a number of different individual driving mechanisms for accomplishing each of these mechanical purposes.

Many such mechanical pieces are capable of accomplishing one or two of these desired functions in concert. However, it is often necessary to provide peculiarly-shaped shafts to both run in bearings and accomplish the power-transmitting functions. Such shafts are usually only useful for one function and are expensive.

DISCLOSURE OF THE INVENTION

In accordance with the present invention, a single unique shaft may be used to accomplish all of the mechanical functions such as driving a self locating gear, turning in a bearing or boss, permitting longitudinal sliding of clutches, turning a keyed device such as a wheel, and permitting the turning of a freely rotating device at the same time. The shaft is basically cylindrical in shape but has grooves or flutes running longitudinally along its length. The flutes are adapted to mate with inwardly-projecting teeth or splines on rotating devices such as wheels, pulleys, and gears and, thereby, drive or be driven by such devices. Moreover, because of its circular outer surface, it runs freely in bearings or through bosses without any structural changes. The rotating device associated with the shaft may have teeth which fit the longitudinal grooves of the shaft and function as a self-locating rotating member or as a part of a clutch or transmission. The advantages of being able to drive so many members by a simple shaft is obvious. At least as important is the fact that if only a single type of shaft is necessary, the cost of manufacture is substantially reduced.

BRIEF DESCRIPTION OF DRAWINGS

The details of the present invention will be described in connection with the accompanying drawings, in which

FIG. 2 is an enlarged view similar to FIG. 1 with portions of the vehicle shown in cross-section;

FIG. 3 is a bottom view with portions of the chassis cut away to shown internal construction;

FIG. 5 is an enlarged, partial cross-sectional view of a wheel and axle assembly, including a shaft constructed in accordance with the present invention;

FIG. 6 is an enlarged, cross-sectional view taken along line 6—6 of FIG. 5;

FIG. 7 is an enlarged, partial perspective of the axle of FIG. 5; and

FIG. 8 is an enlarged, exploded perspective view of the drive shaft and crown gear of FIG. 2.

BEST MODE FOR CARRYING OUT THE INVENTION

Figure 1:
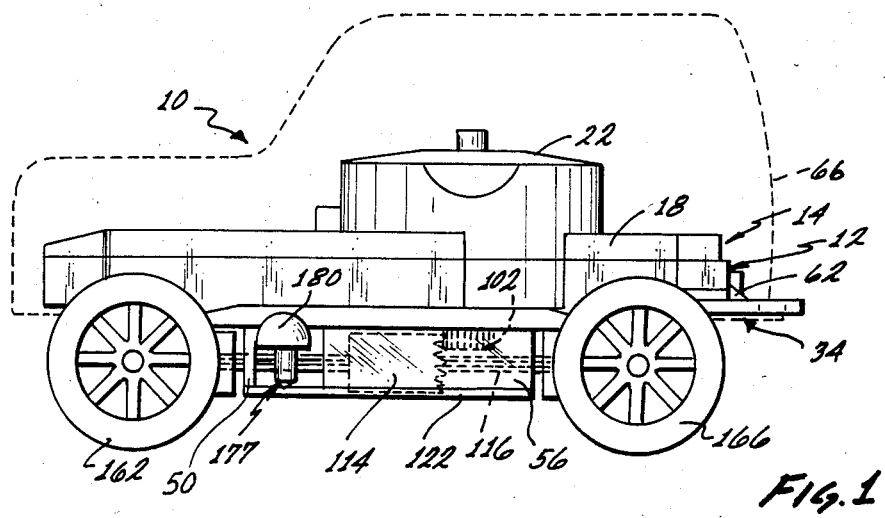
FIG. 1 is a view in side elevation of a vehicle employing the shaft of the present invention, with the vehice body shown schematically.

Referring again to the drawings, and more particularly to FIGS. 1 and 2, a powered toy vehicle, which employs a multiple-use shaft constituting a presently-preferred embodiment of the invention, generally designated 10, includes a housing 12 having an upper housing half 14 and a lower housing half or chassis 16. Upper housing half 14 may be molded as a one-piece unit from a suitable polymeric material and includes a topwall 18 having an opening 20 surmounted by a dome 22. The housing half 14 also includes an encompassing sidewall 24 and an open bottom 26.

Referring now to FIGS. 1-3, the lower housing half 16 includes a wall 28. Wall 28 serves as the platform portion of the chassis 16 and has a front bracket 44 and a rear depending bracket 46. Gear box 40 includes a front wall 50, an intermediate partition 52, a rear wall 54, a left side wall 56 and a right side wall 58. Chassis 16 also includes a rearwardly-extending tongue 60 and a pair of suitable reinforcing gusset plates, like the one shown at 62 (FIG. 1). Tongue 60 may be used to pull other vehicles behind vehicle 10 and is provided with a keyhole-type aperture 64 for connecting other vehicles thereto. Vehicle 10 may also include a suitable body, as indicated schematically at 66, which may be connected to chassis 16 by suitable screws (not shown) passing through apertures 67, 68, 70 and 72 provided in chassis 16 (FIG. 3).

Figure 4:
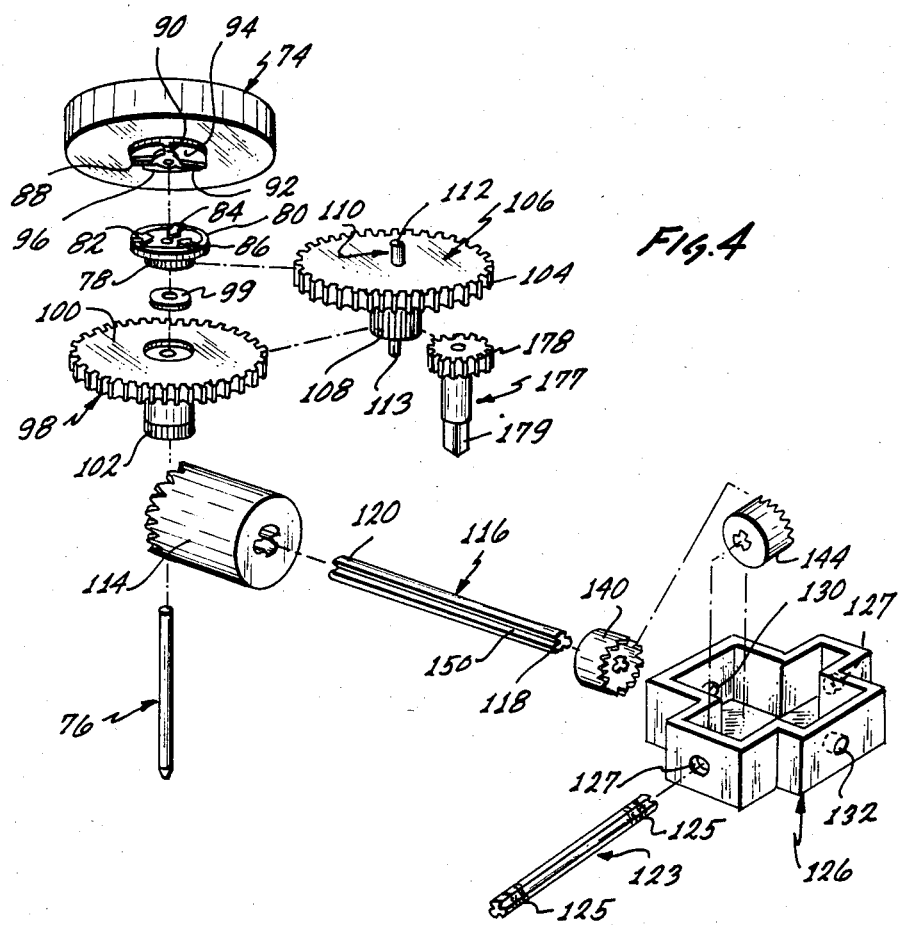
FIG. 4 is an enlarged, exploded perspective view showing the motion-imparting apparatus and associated parts for transmitting power to one axle.

Referring to FIGS. 1-4, vehicle 10 may be powered by a suitable motion-imparting apparatus which is shown herein for purposes of illustration, but not of limitation, as comprising a flywheel 74 mounted in the dome portion 22 of upper housing half 14 by a vertical spindle 76, whereby flywheel 74 will rotate in a horizontal plane. Flywheel 74, which is prefereably made of steel, may be coupled to a suitable output member which is shown herein for purposes of illustration, but not limitation as comprising a pinion gear 78 (FIGS. 2 and 4). Pinion gear 78 may be molded from a suitable material, such as a polyamide reinforced with fiberglass, and is formed integrally with a coupling disc 80 which carries three upstanding protuberances 82, 84, 86 adapted to engage a set of arms 88, 90, 92 provided on a second coupling member 94 which may be molded from a suitable polymeric material and which is seated in an opening 96 provided in the bottom of flywheel 74. Coupling members 80, 94 prevent flywheel 74 from overloading pinion gear 78 and its associated gear train (to be hereinafter described) because fywheel 74 tends to lift coupling member 94 upwardly with respect to coupling member 80 when such overloading occurs.

Flywheel 74 and pinion gear 78 are rotatable on spindle 76 and an output gear 98 is also rotatably mounted thereon beneath a washer 99. Output gear 98 includes a large-diameter gear 100 and a small-diameter pinion gear 102, both of which may be integrally formed from a suitable polymeric material by molding methods well known to those skilled in the art. Preferably, however, large-diamater gear 100 is molded from a polyamide reinforced with fiberglass and pinion gear 102 is made of steel. Pinion gear 102 may be affixed to gear 100 by employing gear 102 as an insert in the mold when gear 100 is molded. The output from pinion gear 78 is transmitted to the large-diameter portion 104 of an intermediate gear 106 having a small-diameter portion 108 meshing with the large-diameter portion 100 of gear 98. Gear 106, which may be molded from a polyamide reinforced with fiberglass, is rotatably mounted in housing 12 by a suitable shaft 110 having an upper end 112 journalled in top wall 18 and a lower end 113 (FIG. 4) journalled in bottom wall 28.

The output from gear 98 is transmitted to a suitable crown gear 114 meshing with the small-diameter portion 102 of gear 98. Crown gear 114 may be made of steel and is keyed to a drive shaft 116 in a manner to be hereinafter described. Drive shaft 116, which may also be made of steel, is preferably a multiple-use shaft of the present invention and includes a front end 118 and a rear end 120. Drive shaft 116 is rotatably mounted in front wall 50, partition 52 and rear wall 54. Drive shaft 116 is held in position in gear box 40 by a closure member 122 (FIG. 1) which may also be used to close the open-bottom portion of gear box 40.

Referring now more particularly to FIGS. 2–5 and 7, vehicle 10 may also include front and rear axles 123, 124 which may be multiple-use shafts of the present invention, which may have a plurality of ring stakes 125 (FIGS. 5 and 7) provided at each end and which may be rotatably mounted in journals 127 provided in front and rear yokes or journal boxes 126, 128, respectively. As shown in FIG. 4 for the journal box 126, each journal box 126, 128 is provided with a rear journal bearing 130 and a front journal pin 132. The front journal box 126 is pivotably coupled to drive shaft 116 by rear journal bearing 130 and to chassis 16 by pivot pin 132 which may be journalled in an aperture 134 provided in front bracket 44. When vehicle 10 is assembled, the journal boxes are first mounted to drive shaft 116 and chassis 16. A first bevel gear 138, which may be made of steel, is then keyed to the rear end 120 of drive shaft 116 and a second bevel gear 140, which may be made of steel, is keyed to end 118 of drive shaft 116 in a manner to be hereinafter described. A third bevel gear 142, which may also be made of steel, may then be held in position in journal box 128 while axle 124 is slid into position trapping the third bevel gear into meshing relationship with bevel gear 138. A fourth bevel gear 144, which may also be made of steel, may then be positioned in front journal box 126 and held in position adjacent the second bevel gear 140 while front axle 123 is slid through the fourth bevel gear 144 to its position in front journal box 126.

As best shown in FIGS. 4 and 6–8, front axle 123, rear axle 124 and drive shaft 116 may each be the same diameter and are each provided with a plurality of outwardly concave flutes 146, 148, 150, each extending the full length of its associated axle or shaft; each also has a small radius 151 where it meets the outer surface of its associated axle or shaft to provide smooth bearing surfaces. The flutes 146, 148, 150 are adapted to transmit torque while leaving about 60% of the shaft to serve as a bearing area. Gears 114, 138, 140, 142 and 144 may then be keyed to their associated torque-transmitting members by providing them with internal splines, as shown at 152, 154, 156 for crown gear 114 (FIG. 8). Each gear is prevented from sliding on its shaft by trapping it between its asociated gear and a fixed wall or locating rib (FIG. 3).

Referring now to FIGS. 2–7, vehicle 10 may also include a pair of front wheels 160, 162 and a pair of rear wheels 164, 166. Each wheel has an inside hub portion 168 (FIG. 5) which preferably includes a chambered opening 181 having a diameter exceeding that of axles 123, 124 to facilitate positioning a hub portion on its associated axle. Additionally, each hub portion 168 includes an inside cylindrical core 182 which (1) is immediately adjacent opening 181, (2) carries a plurality of splines 169 and (3) has a diameter slightly smaller than the diameter of axles 123, 124. With this arrangement hub portions 168 may be press-fit or shrink-fit to their associated axles 123, 124 with splines 169 disposed in associated ones of the flutes 146, 148, 150 for torque-transmitting purposes and with the polymeric hub material flowing into ring stakes 125 to prevent wheels 160, 162, 164, 166 from being pulled off of their associated axles by child-users of vehicle 10.

Use of the multiple-use shaft of the present invention for torque-transmitting axles makes it possible to form ring stakes 125 simultaneously with the cutting of the multiple-use shaft to length without requiring an additional step to provide the shaft with means for transmitting torque to the vehicle wheels. Such an additional step is required when a round, un-fluted shaft is used as a torque-transmitting axle.

Referring again to FIGS. 1–4, flywheel 74 may be brought up to operating speed by a winding gear 177 having an input gear 178 and a square winding shaft 179 both of which may be integrally molded from a suitable polyamide material, such as plyamide reinforced with fiberglass. Winding gear 177 may be rotatably mounted in a hollow boss 180 formed integrally with Chassis 16 in a position such that input gear 178 will mesh with small diameter gear portion 108 of intermediate gear 106. Square shaft 179 is adapted to be engaged by a suitable winding mechanism (not shown), such for example, as the winding mechanism shown in copending Application Ser. No. 524,513, filed Aug. 19, 1983, entitled WINDING AND LAUNCHING DEVICE FOR TOY VEHICLES, now U.S. Pat. No. 4,511,342 and assigned to the Assignee of the instant application.

Operation of vehicle 10 is believed to be apparent and is briefly summarized at this point. Flywheel 74 may be energized to a very high speed by engaging input gear 177 with the above-mentioned winding device while wheels 160, 162, 164, 166 are slightly elevated above the surface upon which vehicle 10 is adapted to travel. Winding gear 177 will then rapidly rotate intermediate gear 106 through input gear 178 and small-diameter gear portion 108 of gear 106. Intermediate gear 106 will then impart rotation to flywheel 74 through large-diameter portion 104, pinion gear 78 and coupling members 80 and 94. Vehicle 10 may be lowered onto its running surface and flywheel 74 will drive vehicle 10 through coupling members 80 and 94, pinion gear 78, large-diameter portion 104 and small-diameter portion 108 of intermediate gear 106, large-diameter portion 100 and smaller-diameter portion 102 of output gear 98, crown gear 114, drive shaft 116, drive shaft output gears 140 and 138 and axle gears 144 and 142, respectively. The multiple-use shaft of the present invention and its associated gears are adapted to receive the high torque generated by flywheel 74.

While the particular multiple-use shaft herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims, which form a part of this disclosure.

I claim:

1. In combination with a toy vehicle having driven supporting wheels and including a journal box, the improvement which comprises;

a first multiple-use shaft rotatably mounted to said journal box in bearing surfaces formed in said journal box, said first multiple-use shaft having a generally cylindrical shape with a series of longitudinally arranged grooves in the outer surface running parallel to the axis of said first shaft along the entire length thereof, each of the grooves having a cross-sectional shape adapted to mate with both gear teeth and keys, the edges of each groove formed by the intersection of the walls thereof with the cylindrical surface being radiused to eliminate gouging of said bearing surfaces, and the outer cylindrical surface being adapted to serve as a bearing surface contacting and coacting with said bearing surfaces;

a first internally splined gear having teeth for engaging another gear and being slidably mounted on said first multiple use shaft by the fitting of the internal splines in the grooves of said first multiple-use shaft, wherein said first shaft is journalled to said box at each end of said first shaft, wherein each of said ends of said first shaft is ring staked and wherein two of said supporting wheels are shrunk-fit, one to each end of said first shaft, each of said wheels including internal splines engaging associated ones of said first series of grooves on said first shaft.

2. The combination recited in claim 1 wherein said first internally-splined gear is a drive shaft gear.

3. In combination with a toy vehicle having driven supporting wheels and including a journal box, the improvement which comprises;

a first multiple-use shaft rotatably mounted to said journal box in bearing surfaces formed in said journal box, said first multiple-use shaft having a generally cylindrical shape with a series of longitudinally arranged grooves in the outer surface running parallel to the axis of said first shaft along the entire length thereof, each of the grooves having a cross-sectional shape adapted to mate with both gear teeth and keys, the edges of each groove formed by the intersection of the walls thereof with the cylindrical surface being radiused to eliminate gouging of said bearing surfaces, and the outer cylindrical surface being adapted to serve as a bearing surface contacting and coacting with said bearing surfaces;

a first internally splined gear having teeth for engaging another gear and being slidably mounted on said first multiple-use shaft by the fitting of the internal splines in the grooves of said first multiple-use shaft, wherein said journal box is provided with first, second and third journals, said first and second journals being aligned along a first axis, said third journal lying along a second axis normal to said first axis, wherein said improvement also includes:

said first shaft being rotatably mounted to said third journal, wherein said first gear is outside said journal box and a second multiple-use shaft having a generally cylindrical shape with a second series of longitudinally arranged grooves in the outer surface running parallel to the axis of the shaft, each of said second series of grooves having a cross-sectional shape adapted to mate with both gear teeth and keys, the edges of each groove of said second series of grooves formed by the intersection of the walls thereof with the cylindrical surface being radiused to eliminate gouging of bearing surfaces, and the outer cylindrical surface of said second shaft being adapted to serve as a bearing surface, said second shaft having first and second ends, said second shaft being journalled to said first journal adjacent one of said ends and to said second journal adjacent the other of said ends;

a second internally splined gear slidably mounted on said first shaft in said second series of grooves inside of said journal box; and a third internally splined gear slidably mounted on said second shaft by the fitting of the internal splines thereof in said second series of grooves inside of said journal box in driving engagement with said second gear.

4. The combination recited in claim 3 including a wheel mounted on each end of said second shaft.

5. The combination recited in claim 4 wherein said first and second ends of said second shaft are provided with ring stakes, wherein each of said wheels includes a hub having internal splines engaged in associated ones of said grooves on said second shaft with the internal wall of each hub being shrunk-fit to associated ones of said ring stakes.

* * * * *